United States Patent
Katada et al.

(10) Patent No.: US 8,964,332 B1
(45) Date of Patent: Feb. 24, 2015

(54) MICROWAVE-ASSISTED MAGNETIC RECORDING HEAD WITH ASYMMETRIC SIDE GAP FOR SHINGLED MAGNETIC RECORDING

(71) Applicant: HGST Netherlands B.V., Amsterdam (NL)

(72) Inventors: Hiroyuki Katada, Odawara (JP); Masato Shiimoto, Odawara (JP); Maki Maeda, Hiratsuka (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/042,459

(22) Filed: Sep. 30, 2013

(51) Int. Cl.
| | | |
|---|---|---|
| *G11B 5/187* | (2006.01) | |
| *G11B 5/56* | (2006.01) | |
| *G11B 5/10* | (2006.01) | |
| *G11B 5/60* | (2006.01) | |
| *G11B 5/00* | (2006.01) | |
| *G11B 20/10* | (2006.01) | |

(52) U.S. Cl.
CPC .. *G11B 5/56* (2013.01); *G11B 5/10* (2013.01); *G11B 5/6005* (2013.01); *G11B 2005/0024* (2013.01); *G11B 2020/10898* (2013.01)
USPC ..................................................... 360/125.3

(58) Field of Classification Search
CPC ........... G11B 5/105; G11B 5/187; G11B 5/23
USPC ......................... 360/119.01, 122, 125.3, 319
See application file for complete search history.

(56) References Cited

U.S. PATENT DOCUMENTS

| | | | |
|---|---|---|---|
| 8,027,110 B1 | 9/2011 | Yamanaka et al. | |
| 8,223,458 B2 * | 7/2012 | Mochizuki et al. | 360/125.1 |
| 8,339,734 B2 * | 12/2012 | Pentek et al. | 360/119.03 |
| 8,553,359 B2 * | 10/2013 | Yamada et al. | 360/125.02 |
| 8,553,507 B1 * | 10/2013 | Tagawa et al. | 369/13.33 |
| 8,705,206 B1 * | 4/2014 | Maeda et al. | 360/125.3 |
| 8,810,946 B2 * | 8/2014 | Yasui et al. | 360/59 |
| 8,830,625 B2 * | 9/2014 | Linville et al. | 360/125.3 |
| 8,848,317 B2 * | 9/2014 | Shiimoto et al. | 360/125.3 |
| 2009/0080109 A1 | 3/2009 | Fukuzawa et al. | |
| 2009/0310244 A1 | 12/2009 | Shimazawa et al. | |

(Continued)

OTHER PUBLICATIONS

Shunji Takenoiri et al., "Magnetic Recording Media: Technical Trends and Future Outlook", Fuji Electric Review, 2011, pp. 32-36, vol. 57, No. 2, URL: http://www.fujielectric.com/company/tech/pdf/57-02/FER-57-2-032-2011.pdf.

(Continued)

*Primary Examiner* — Angel Castro
(74) *Attorney, Agent, or Firm* — John D. Henkhaus

(57) ABSTRACT

Approaches to improving the signal-to-noise ratio in a microwave-assisted magnetic recording hard disk drive over the entire region from the inner diameter to the outer diameter of the disk, especially in the context of shingled magnetic recording, include a narrower side gap on the side opposing a spin torque oscillator offset direction than the side gap in the offset direction, thereby increasing the gradient of the recording magnetic field in the cross-track direction and reducing the track edge noise of the recording pattern. Embodiments include use of a side shield on the side opposing the offset direction that has a higher saturation magnetization than the side shield on the side in the offset direction, thereby further increasing the gradient of the recording magnetic field in the cross-track direction.

13 Claims, 5 Drawing Sheets

(56) References Cited

U.S. PATENT DOCUMENTS

| | | |
|---|---|---|
| 2010/0027161 A1 | 2/2010 | Takagishi et al. |
| 2011/0090603 A1 | 4/2011 | Bai |
| 2011/0102942 A1 | 5/2011 | Bai et al. |
| 2011/0134561 A1 | 6/2011 | Smith et al. |
| 2011/0242707 A1* | 10/2011 | Yoon et al. ............... 360/294.1 |
| 2011/0249359 A1 | 10/2011 | Mochizuki et al. |
| 2011/0273800 A1 | 11/2011 | Takano et al. |
| 2012/0033534 A1 | 2/2012 | Yamanaka et al. |
| 2012/0113543 A1 | 5/2012 | Shiimoto et al. |
| 2012/0120518 A1 | 5/2012 | Matsubara et al. |
| 2012/0147502 A1 | 6/2012 | Udo et al. |

OTHER PUBLICATIONS

Ahmed Amer, et al., "Design Issues for a Shingled Write Disk System", IEEE, 2010, 12 pages, 978-1-4244-7153-9/10, URL: http://www.storageconference.org/2010/Papers/MSST/Amer.pdf.

* cited by examiner

MICROWAVE-ASSISTED MAGNETIC RECORDING HEAD WITH ASYMMETRIC SIDE GAP FOR SHINGLED MAGNETIC RECORDING

FIELD OF THE INVENTION

Embodiments of the invention relate generally to magnetic recording and more particularly to improving the signal-to-noise ratio in a hard disk drive.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator.

A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

Increasing areal density (a measure of the quantity of information bits that can be stored on a given area of disk surface) is one of the ever-present holy grails of hard disk drive design evolution, and has led to the necessary development and implementation of various means for reducing the disk area needed to record a bit of information. It has been recognized that one significant challenge with minimizing bit size is based on the limitations imposed by the superparamagnetic effect whereby, in sufficiently small nanoparticles, the magnetization can randomly flip direction under the influence of thermal fluctuations.

Microwave-Assisted Magnetic Recording

"MAMR" refers to "microwave-assisted magnetic recording". Using MAMR, the head slider emits a microwave field that excites the electrons in the media, building up energy that eases and assists the process of writing data bits. The MAMR process is likely to use a localized high frequency magnetic field generated by a magnetic thin film stack integrated into the head sliders. One technique for implementing such a film stack utilizes a spin torque oscillator (STO). The STO element injects auxiliary magnetic flux to the write pole to facilitate the magnetization switching of the write pole, where electrical current to the STO induces rotation of the magnetization of a free ferromagnetic layer in the STO, which generates the auxiliary magnetic flux. Applying this AC magnetic field to the media reduces the coercivity of the media, thereby facilitating high-quality recording.

Shingled Magnetic Recording

A shingled magnetic recording (SMR) system is another recording method for improving areal density. SMR can obtain high surface density without reducing the strength of the recording magnetic field by using a recording head which is wider than the track pitch. With SMR, during recording of a given track, the track is recorded while overwriting one side of the adjacent recording pattern that has already been recorded. Recording tracks are successively formed while always overwriting the recording pattern on the same side. As a result, the effective recording track width in the SMR system is the width of the recording pattern formed by the recording head, less the width of the portion which has been overwritten and deleted by the adjacent track. Therefore, the width of the main pole of the recording head in the SMR system need not match the width of the recording track, and a recording head having a wider pole width than the effective recording track width can be used. Consequently, sufficient writing capacity can be obtained even with a narrow effective track width and, as a result, a higher track density can be realized and a higher areal density can be obtained.

Combining MAMR and SMR, i.e., combining an STO with a pole having a wide width, can be expected to obtain even higher surface recording density. However, conventional combinations of MAMR and SMR do not necessarily obtain an improvement in the SNR (signal-to-noise ratio) by MAMR over the entire region from the inner to the outer diameter of the disk.

SUMMARY OF EMBODIMENTS OF THE INVENTION

Embodiments of the invention are directed to a microwave-assisted magnetic recording (MAMR) head design having an asymmetric side gap, which enables an improvement to the signal-to-noise ratio (SNR) over the entire region from the inner diameter to the outer diameter of the disk, especially noteworthy in the context of shingled magnetic recording (SMR).

Embodiments include a wrap-around shield (WAS) that wraps around a portion of the main pole, gaps between the main pole and the WAS, and a spin torque oscillator (STO) positioned between the main pole and a trailing portion of the shield and offset in a particular lateral direction from the centerline of the main pole. The side gap on the side opposing the offset direction is narrower than the side gap in the offset direction, thereby increasing the gradient of the recording magnetic field in the cross-track direction and reducing the track edge noise of the recording pattern.

Embodiments include use of a side shield on the side opposing the offset direction that has a higher saturation magnetization than the saturation magnetization of the side shield on the side in the offset direction, thereby increasing the gradient of the recording magnetic field in the cross-track direction.

In the context of SMR, the left side or the right side of the recording head may be selectively used to increase the SNR at various skew angles, according to an embodiment.

Embodiments discussed in the Summary of Embodiments of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Described herein are approaches to the use of a microwave-assisted magnetic recording (MAMR) head having an asymmetric side gap to improve the signal-to-noise ratio (SNR) over the entire region from the inner diameter to the outer diameter of the disk, for example, for use in a shingled magnetic recording (SMR) hard disk drive (HDD). In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Figure 1:
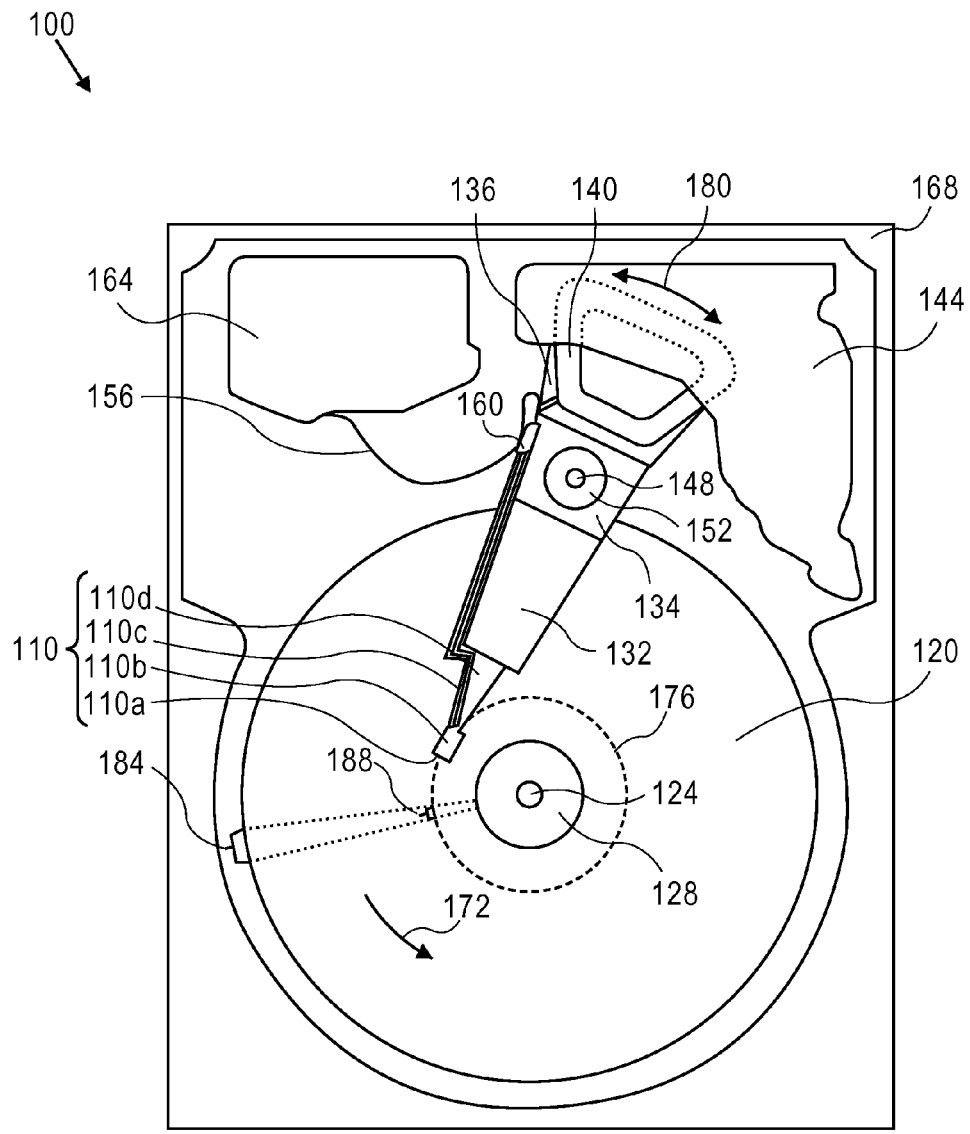
FIG. 1 is a plan view of a hard disk drive (HDD), according to an embodiment of the invention.

Embodiments of the invention may be used in the context of a magnetic writer for a hard-disk drive (HDD). In accordance with an embodiment of the invention, a plan view illustrating an HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider, and a load beam 110d attached to the lead suspension 110c. The HDD 100 also includes at least one magnetic-recording media 120 rotatably mounted on a spindle 124 and a drive motor (not shown) attached to the spindle 124 for rotating the media 120. The head 110a includes a write element and a read element for respectively writing and reading information stored on the media 120 of the HDD 100. The media 120 or a plurality (not shown) of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown). The armature 136 of the VCM is attached to the carriage 134 and is configured to move the arm 132 and the HGA 110 to access portions of the media 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110b rides so that the slider 110b flies above the surface of the media 120 without making contact with a thin magnetic-recording medium in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks (not shown) arranged in sectors on the media 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Figure 2:
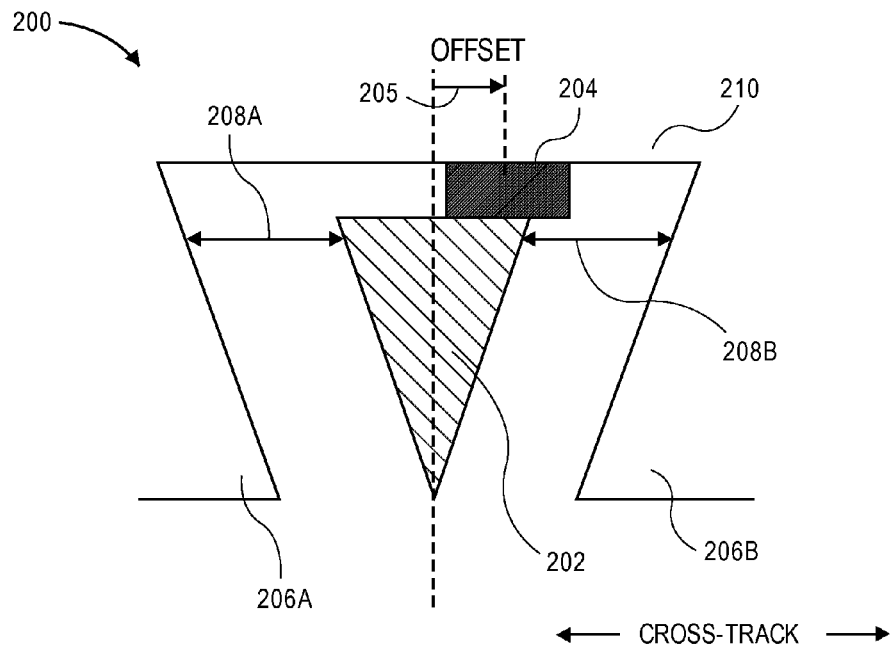
FIG. 2 is an air bearing surface (ABS) view of a shingled magnetic recording (SMR) head having a spin torque oscillator (STO), according to an embodiment of the invention.

FIG. 2 is an air bearing surface (ABS) view of a shingled magnetic recording (SMR) head having a spin torque oscillator (STO), according to an embodiment of the invention. SMR head 200 comprises a main (recording) pole 202 and side gaps 208a and 208b between main pole 202 and side shields 206a and 206b, respectively. SMR head 200 further comprises an STO 204 formed between the main pole 202 and a trailing shield 210. In conformity with SMR recording, the width of the main pole 202 is wider than the width of the STO 204. The ratio of the widths of the main pole 202 and the STO 204 is typically optimized according to the combination with the medium and/or the recording density. The STO 204 is arranged offset from the center of the main pole 202 in the cross-track direction, in a particular offset direction 205. With this structure, the side gap 208a is the same width as the side gap 208b.

Figure 3:
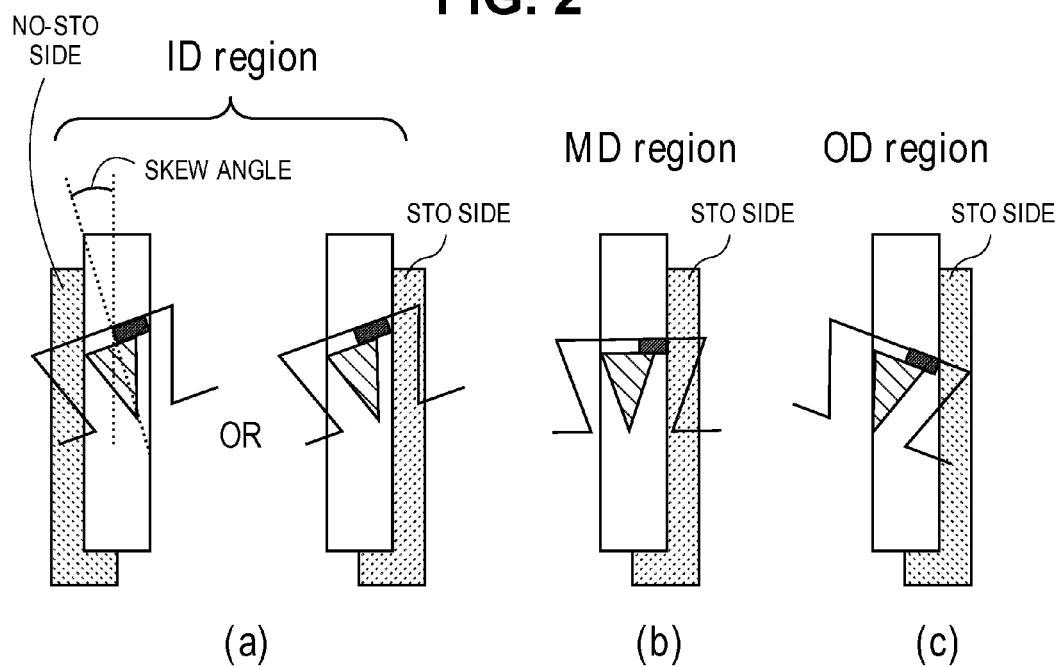
FIG. 3 is a schematic diagram illustrating the arrangement of a recording track and write head when using an SMR head having a STO configured as in FIG. 2, at (a) an inner diameter region, (b) a middle diameter region, and (c) an outer diameter region, according to an embodiment of the invention.

FIG. 3 is a schematic diagram illustrating the arrangement of a recording track and write head when using an SMR head having a STO, such as SMR head 200 of FIG. 2, at (a) an inner diameter region, (b) a middle diameter region, and (c) an outer diameter region, according to an embodiment of the invention. For a non-limiting example, the inner diameter may be where the radius of the disk is approximately 14.2 mm, the middle diameter may be where the radius of the disk is approximately 21.5 mm, and the outer diameter may be where the radius of the disk is approximately 29.6 mm.

Overwriting is usually done by the drive used in the SMR recording system, either to the left or right of the main pole, depending on the radial position of the disk. That is, depending on the radial position of the disk, the right side is overwritten leaving the portion written to the left of the main pole, or the left side is overwritten leaving the portion written to the right of the main pole.

As shown in FIG. 3(b), at the middle diameter of the disk, the recording head and the recording track are arranged in parallel. With this arrangement, the edge of the track is overwritten so as to leave the portion recorded on the STO side, and this arrangement typically results in a high SNR recording. As shown in FIG. 3(c), at the outer diameter of the disk, the recording head is arranged at a skew angle to the recording track. This arrangement also typically results in a high SNR recording and there is little deterioration in the SNR in the case in which the track edge is overwritten in a manner leaving the portion recorded on the STO side (referred to as "clean edge writing").

As shown in FIG. 3(a), at the inner diameter of the disk, the recording head is arranged at a skew angle to the recording track in the opposite direction as on the outer-diameter side. In the case of overwriting in a manner leaving the portion recorded on the STO side (the right hand schematic of FIG. 3(a)), the magnetic field on the leading edge side of the main pole 202 (FIG. 2) protrudes on the recording track side (referred to as "dirty edge writing"). Consequently, the SNR of the track before overwriting is reduced. The SNR after overwriting is also reduced because the magnetic field is applied to the portion of the track that should be remaining after overwriting one cycle earlier. Although the SNR is not reduced by the magnetic field on the leading side of the main pole 202 (FIG. 2) in the case of overwriting the edge of the track in a manner leaving the portion recorded on the side without the STO (clean edge writing, with reference to the left hand schematic of FIG. 3(a)), the assist effect of the STO 204 (FIG. 2) cannot be used and the SNR is greatly reduced compared to the middle diameter.

INTRODUCTION

The greater the strength of the AC magnetic field generated by the STO and the greater the assist gain in SNR, the more that the direction of magnetization of the field generation layer, which is the source of the AC magnetic field within the structure of an STO, is arranged in one direction within the plane. The narrower the width of the STO, the easier it is to arrange magnetization of the field generation layer in one direction. Therefore, the width of the STO in a MAMR head may be of the same order as the effective track width. When the width of the STO is narrower than the effective track width, an AC magnetic field cannot be applied to the entire track width and produces little assist gain. Furthermore, when the width of the STO is wider than the effective track width, the strength of the AC magnetic field is reduced.

In the case of recording while overwriting one side of a track in the SMR recording system, the width of the STO should be about the same as the effective track width in order to apply an AC magnetic field to the entire effective track width after overwriting. Therefore, the width of the STO is preferably narrower than the width of the main pole, and the STO is preferably shifted either left or right with respect to the main pole.

As discussed, depending on the radial position of the disk, in an SMR recording system the right side is overwritten leaving the portion written to the left of the main pole, or the left side is overwritten leaving the portion written to the right of the main pole. Hence, overwriting in a manner leaving the STO side in a certain region of a disk obtains assist gain by the STO in the case of SMR recording using a recording head having an STO offset from the center of the main pole, but this means overwriting the side opposite to the STO in another region, causing loss of assist gain. Thus, the conventional combination of MAMR and SMR is problematic in that it does not obtain the assist gain by MAMR over the entire disk, and so does not obtain a high SNR over the entire disk.

MAMR Head with Asymmetric Side Gap for SMR

Figure 4:
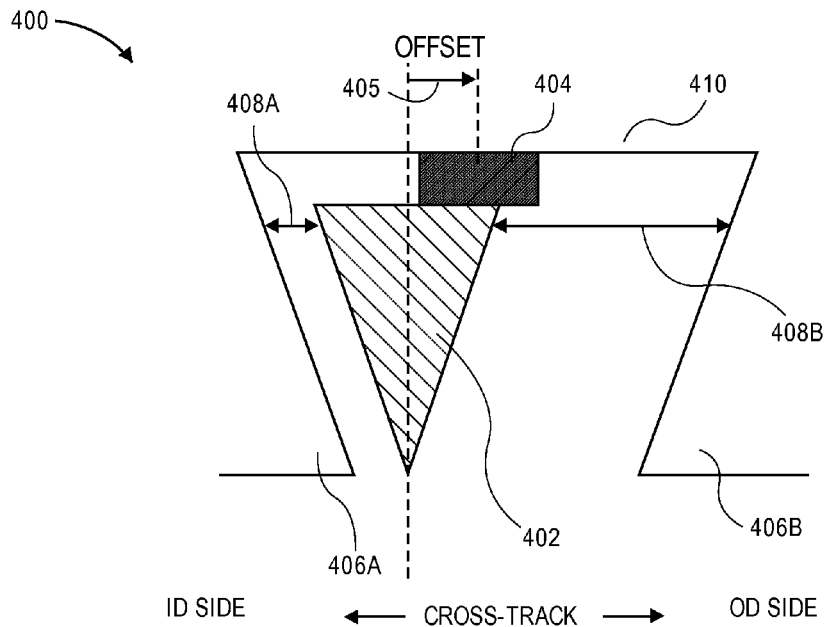
FIG. 4 is an ABS view of an SMR head having an STO, according to an embodiment of the invention.

FIG. 4 is an ABS view of an SMR head having an STO, according to an embodiment of the invention. SMR head 400 comprises a main (recording) pole 402, side gap 408a and side gap 408b between main pole 402 and side shields 406a and 406b, respectively. SMR head 400 further comprises an STO 404 formed between the main pole 402 and a trailing shield 410. In conformity with SMR recording, the width of the main pole 402 is wider than the width of the STO 404. The ratio of the widths of the main pole 402 and the STO 404 is typically optimized according to the combination with the medium and/or the recording density. The STO 404 is arranged offset from the center of the main pole 402 in the cross-track direction, in a particular offset direction 405.

In the structure of SMR head 200 of FIG. 2, the side gap 208a is the same width as the side gap 208b. For example, the side gap in this structure may be approximately 80 nm on both sides. By contrast, according to the embodiment illustrated with SMR head 400 of FIG. 4, the side gap 408a on the side without the STO is narrower than the side gap 408b on the side with the STO. For a non-limiting example, the width of the main pole may be approximately 80 nm, the width of the STO may be approximately 40 nm, and the gap width between the main pole and the trailing shield may be approximately 25 nm, with the STO 404 offset from the center of the main pole to the outer-diameter side of the disk a distance of approximately 25 nm.

Figure 5:
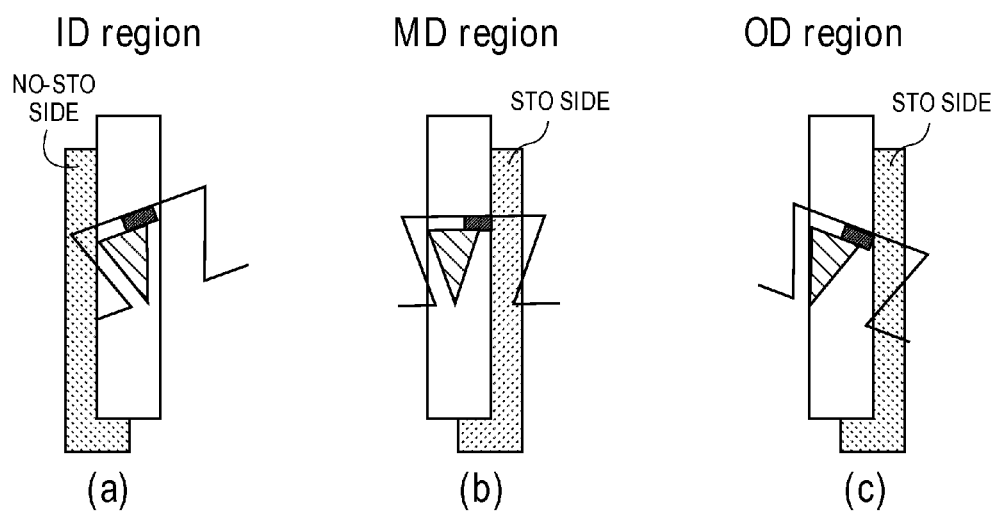
FIG. 5 is a diagram illustrating the arrangement of a recording track and write head when using an SMR head having an STO as illustrated in FIG. 4, at (a) an inner diameter region, (b) a middle diameter region, and (c) an outer diameter region, according to an embodiment of the invention.

FIG. 5 is a diagram illustrating the arrangement of a recording track and write head when using an SMR head having an STO as illustrated in FIG. 4, at (a) an inner diameter region, (b) a middle diameter region, and (c) an outer diameter region, according to an embodiment of the invention. For a non-limiting example, the inner diameter may be where the radius of the disk is approximately 14.2 mm, the middle diameter may be where the radius of the disk is approximately 21.5 mm, and the outer diameter may be where the radius of the disk is approximately 29.6 mm.

As discussed, overwriting is usually done by the drive used in the SMR recording system, either to the left or right of the main pole, depending on the radial position of the disk. That is, depending on the radial position of the disk, the right side is overwritten leaving the portion written to the left of the main pole, or the left side is overwritten leaving the portion written to the right of the main pole.

The cases of FIG. 5(b) middle diameter region and FIG. 5(c) outer diameter region are the same as when using a recording head such as SMR head 200 (FIG. 2). However, in the case of FIG. 5(a) inner diameter region, the recording head of the present invention overwrites the edge of the track leaving the side without the STO. In such a scenario, there is no assist effect by the STO. The magnetic field gradient in the cross-track direction is high, however, due to the narrow side gap, which can make the SNR of the recording track higher than when using a recording head such as SMR head 200. In the case of recording to leave the side without the STO (see, e.g., the left hand schematic of FIG. 3(a)), recording may be charged or not charged through the STO, whereby not charging has the advantage of reducing power consumption of the drive.

Figure 6:
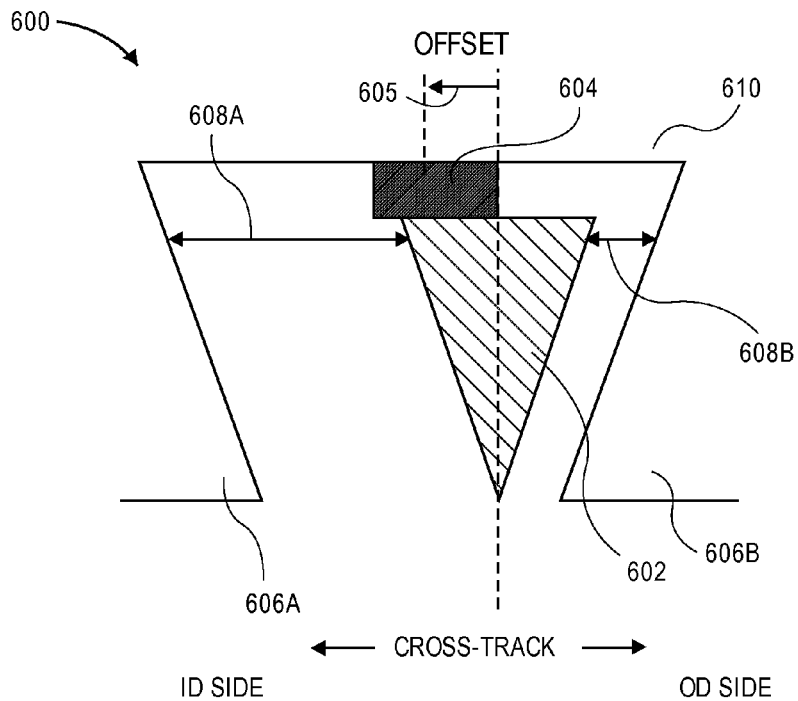
FIG. 6 is an ABS view of an SMR head having an STO, according to an embodiment of the invention.

FIG. 6 is an ABS view of an SMR head having an STO, according to an embodiment of the invention. The embodiment illustrated in FIG. 6 is the reverse of the embodiment illustrated in FIG. 4, in that the STO is shifted to the inner-diameter side of the disk and the side gap is narrower on the outer-diameter side. SMR head 600 comprises a main (recording) pole 602, side gap 608a and side gap 608b between main pole 602 and side shields 606a and 606b, respectively. SMR head 600 further comprises an STO 604 formed between the main pole 602 and a trailing shield 610. In conformity with SMR recording, the width of the main pole 602 is wider than the width of the STO 604. The ratio of the widths of the main pole 602 and the STO 604 is typically optimized according to the combination with the medium and/or the recording density. The STO 604 is arranged offset from the center of the main pole 602 in the cross-track direction, in a particular offset direction 605.

With the structure of SMR head 200 of FIG. 2, the side gap 208a is the same width as the side gap 208b. For example, the side gap in this structure may be approximately 80 nm on both sides. By contrast, according to the embodiment illustrated with SMR head 600 of FIG. 6, the side gap 608b on the side without the STO is narrower than the side gap 608a on the side with the STO. For a non-limiting example, the width of the main pole may be approximately 80 nm, the width of the STO may be approximately 40 nm, and the gap width between the main pole and the trailing shield may be approximately 25 nm, with the STO 604 offset from the center of the main pole to the outer-diameter side of the disk a distance of approximately 25 nm.

Figure 7:
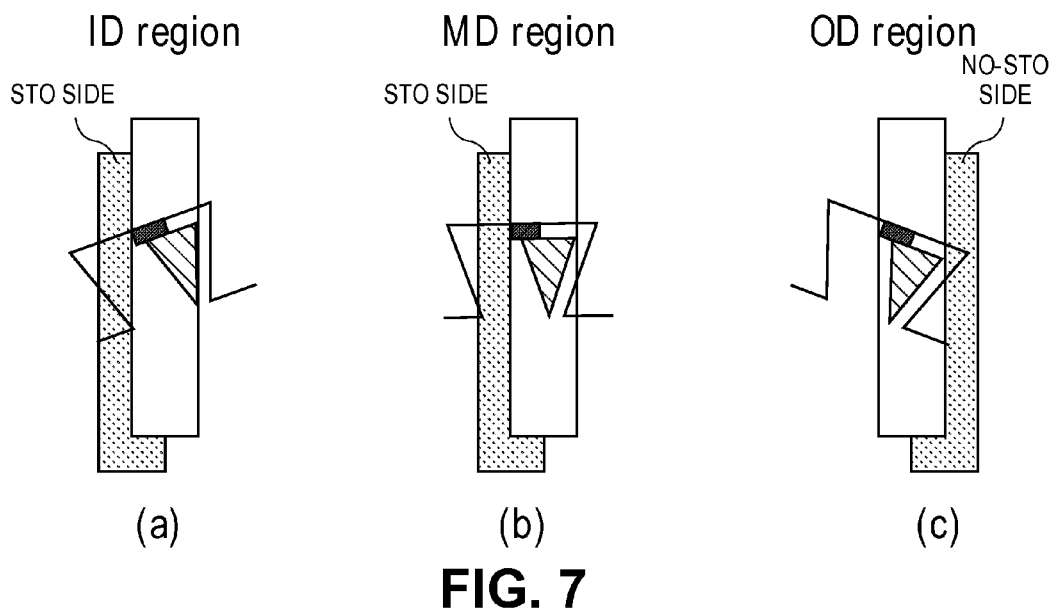
FIG. 7 is a diagram illustrating the arrangement of a recording track and write head when using an SMR head having an STO as illustrated in FIG. 6, at (a) an inner diameter region, (b) a middle diameter region, and (c) an outer diameter region, according to an embodiment of the invention.

FIG. 7 is a diagram illustrating the arrangement of a recording track and write head when using an SMR head having an STO as illustrated in FIG. 6, at (a) an inner diameter region, (b) a middle diameter region, and (c) an outer diameter region, according to an embodiment of the invention. In this case, as illustrated in FIG. 7, overwriting in the middle diameter region in order to leave the STO side (clean edge writing, using STO side in contrast to using no-STO side in FIG. 5 structure) and overwriting in the inner diameter region in order to leave the STO side, (as with the FIG. 5 structure), and overwriting on the outer-diameter side in order to leave the side without the STO (clean edge writing, using no-STO side in contrast to using STO side in FIG. 5 structure), can produce a higher SNR on the outer-diameter side than with the structure of a recording head such as SMR head 200 (FIG. 2). Thus, the capacity of a hard disk drive can be increased in a similar manner with SMR head 600 as with the embodiment of SMR head 400 depicted in FIG. 4, due to high cross-track magnetic field gradient.

An Example MAMR Head Design with Asymmetric Side Gap for SMR

Research involving the relationships between the magnetic field gradient and the side gap in the cross-track direction (with no STO, or STO-off) and between the magnetic field strength and the side gap (in a scenario in which the side gap is the same length on both sides) shows that the magnetic field gradient in the cross-track direction improves but that the recording magnetic field strength is reduced, however, as the side gap becomes narrower. Therefore, the side gap is usually set as narrow as possible within a range at which sufficient magnetic field strength is obtained for the recording density of the medium.

The size of a sufficient recording magnetic field strength varies depending on the size of the flux reversal magnetic field of the medium, the space between the head and the medium, and the like. The magnetic field strength generated by the main pole varies depending on the shape of the main pole, the shape of the shield, the trailing gap, the recording current, and the like. Therefore, the optimum side gap also varies depending on these factors. For a non-limiting example, the side gap on the side without the STO (the side gap on the inner-diameter side) may be approximately 30 nm and the side gap on the STO side (the side gap on the outer-diameter side) may be approximately 100 nm, for a MAMR SMR head design such as SMR head 400 illustrated in FIG. 4. In the present example, the side gap on the side without the STO has been narrowed to 30 nm, which increases the magnetic field gradient in the cross-track direction compared to the SMR head 200 of FIG. 2. Were the side gap on the STO side made equal to the side gap on the side without the STO, the magnetic field strength would be insufficient. Therefore, widening the side gap on the STO side to 100 nm augments the magnetic field strength.

Further, research involving the relationship between the cross-track magnetic field gradient on the STO side and the side gap, with STO-on, shows that the effective magnetic field gradient on the STO side is higher than when there is no STO (i.e., STO-off). The effective magnetic field gradient on the STO side is nearly constant even if the side gap varies, indicating that the gradient of the magnetic field generated by the STO prevails on the STO side. Therefore, even widening the side gap on the STO side from 80 nm to 100 nm in the present example does not deteriorate the magnetic field gradient in the cross-track direction on the STO side.

SMR Recording with a MAMR Head with Asymmetric Side Gap

The dependency of the SNR on the skew angle of the recording head was assessed, in the case of overwriting leaving the portion recorded on the STO side and in the case of overwriting leaving the portion recorded on the side without the STO, for heads having a structure such as SMR head 200 (FIG. 2) and the structure according to embodiments, such as SMR head 400 of FIG. 4. The skew angle is zero degrees at the middle diameter of the disk, a positive angle on the inner-diameter side of the disk, and a negative angle on the outer-diameter side of the disk. Although the SNR on the STO side is high at the outer and middle diameters, the SNR is reduced on the inner-diameter side, for both the SMR head 200 structure and the structure according to embodiments. In the case of the SNR on the side without the STO, the SNR is significantly higher with the structure of the embodiments than with the SMR head 200 structure, on the OD side. Further in the case of the SNR on the side without the STO, the SNR is still higher (e.g., around 1 dB) with the structure of the embodiments than with the SMR head 200 structure, on the ID side. Both are due at least in part due to the structure of the embodiments having a higher cross-track magnetic field gradient on the side without the STO than the structure of SMR head 200.

Using either the left side or the right side of the recording head by the drive may be selected in order to increase the SNR at each skew angle, i.e., at each radial position. Thus, according to an embodiment, a shingled magnetic recording head of the structure of the embodiments (e.g., SMR head 400 of FIG. 4) may be used to overwrite leaving the STO side in the disk region where the skew angle is less than around ten degrees, and to overwrite leaving the side without the STO in the disk region where the skew angle is around ten degrees or greater. As a result, the structure according to embodiments of the invention can increase the SNR more than the SMR head 200 (FIG. 2) structure, in the region where the skew angle is ten degrees or greater. Consequently, using a recording head having the structure according to embodiments can increase the capacity of a hard disk drive.

For example, a hard disk drive electronic component (such as a write-channel electronic component as described in reference to FIG. 1) is configured to execute one or more sequences of instructions which, when executed by one or more processors, causes the hard disk drive to overwrite in the foregoing manner based on the region of the disk on which the drive is writing. The process logic embodied in the one or more sequences of instructions may be implemented, for example, as analog or digital hardware circuitry within the electronic component or as firmware instructions executed by a processor on board or separate from the electronic component.

MAMR Head with High Saturation Magnetization Material Side Shield

Figure 8:
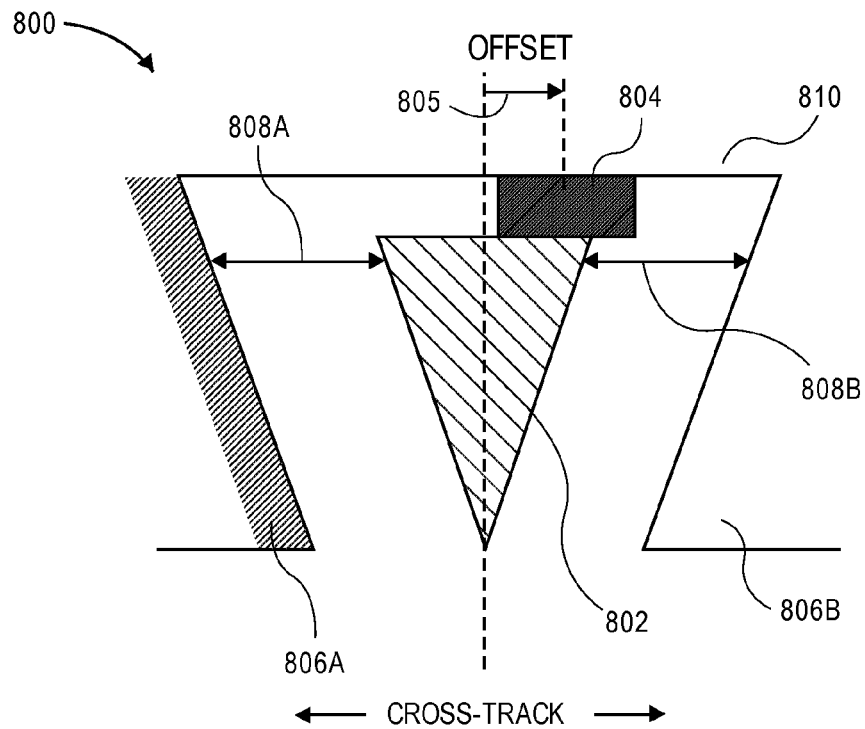
FIG. 8 is an ABS view of an SMR head having an STO, according to an embodiment of the invention.

FIG. 8 is an ABS view of an SMR head having an STO, according to an embodiment of the invention. SMR head 800 comprises a main (recording) pole 802 and side gaps 808a and 808b between main pole 802 and side shields 806a and 806b, respectively. SMR head 800 further comprises an STO 804 formed between the main pole 802 and a trailing shield 810. In conformity with SMR recording, the width of the main pole 802 is wider than the width of the STO 804. The ratio of the widths of the main pole 802 and the STO 804 is typically optimized according to the combination with the medium and/or the recording density. The STO 804 is arranged offset from the center of the main pole 802 in the cross-track direction, in a particular offset direction 805. In this embodiment, the side gap 808a is the same width as the side gap 808b.

According to the embodiment illustrated in FIG. 8, SMR head 800 comprises a structure in which the region of the side shield 806a opposing the side with the STO 804 comprises a material having high saturation magnetization ($B_s$). Making this region of the side shield from a material having a higher $B_s$ than the other portions of the shield, such as opposing side shield 806b and trailing shield 810, may improve the cross-track gradient on the side without the STO, similarly as with the embodiment of SMR head 400 (FIG. 4) which comprises a narrow side gap 408a (FIG. 4). Consequently, the structure of SMR head 800 may obtain a higher SNR than the structure of SMR head 200 (FIG. 2).

Further, the STO 804 may be arranged on the outer-diameter side of the disk (as shown in FIG. 8) or on the inner-diameter side of the disk. Regardless of the side to which STO 804 is biased, the side shield on the opposite side of STO 804 comprises the high saturation magnetization material.

Although only the side shield on the side without the STO is made from a high saturation magnetization material in SMR head 800 of FIG. 8, the same or a similar high $B_s$ material may also be used for the surface of the trailing shield 810 on the side opposite STO 804, according to an embodiment. Using a high $B_s$ material in a region of the trailing shield 810 opposite the STO 804 may further improve the cross-track gradient on the side without the STO 804.

Figure 9:
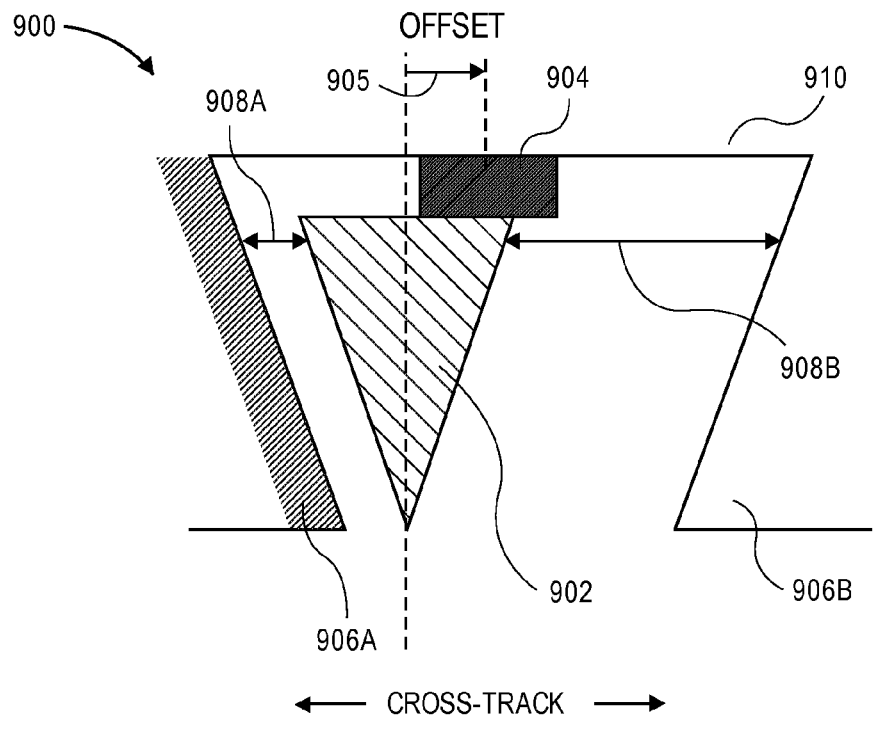
FIG. 9 is an ABS view of an SMR head having an STO, according to an embodiment of the invention.

FIG. 9 is an ABS view of an SMR head having an STO, according to an embodiment of the invention. SMR head 900 comprises a main (recording) pole 902 and side gaps 908a and 908b between main pole 902 and side shields 906a and 906b, respectively. SMR head 900 further comprises an STO 904 formed between the main pole 902 and a trailing shield 910. In conformity with SMR recording, the width of the main pole 902 is wider than the width of the STO 904. The ratio of the widths of the main pole 902 and the STO 904 is typically optimized according to the combination with the medium and/or the recording density. The STO 904 is arranged offset from the center of the main pole 902 in the cross-track direction, in a particular offset direction 905.

According to the embodiment illustrated in FIG. 9, SMR head 900 comprises a structure in which the side gap 908a on the side without the STO 904 is narrower than the side gap 908b on the side with the STO 904, and in which the region of the side shield 906a opposing the side with the STO 904 comprises a material having high saturation magnetization ($B_s$). The effects of the narrow side gap 908a and the high $B_s$ material of the side shield 906a may improve the cross-track gradient on the side without the STO 904. Consequently, the structure of SMR head 800 may obtain a higher SNR than the structure of SMR head 200 (FIG. 2).

Further, according to embodiments, the STO 904 may be arranged on the outer-diameter side of the disk (as shown in FIG. 9) or on the inner-diameter side of the disk. Regardless of the side to which STO 904 is biased, the side shield on the opposite side of STO 804 comprises the high saturation magnetization material. Still further, the material of the side shield 906b on the STO 904 side may be a high-$B_s$ material, or a material having the same level of $B_s$ as the other portions of the shield such as trailing shield 910.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A microwave-assisted magnetic recording (MAMR) head comprising:
   a magnetic writer main pole extending to an air bearing surface;
   a shield wrapping around at least a portion of said main pole, said shield comprising a trailing shield at a trailing side of said main pole and a side shield at each respective side of said main pole in a cross-track direction;
   a gap between said main pole and said shield, said gap comprising a trailing gap between said trailing shield and said main pole and a side gap between each respective side shield and said main pole;
   a spin torque oscillator (STO) element positioned between said main pole and said trailing shield and offset in a particular offset direction from a centerline of said main pole; and
   wherein the side gap positioned on the side opposing said offset direction is narrower than the side gap positioned on the side of said offset direction.

2. The MAMR head of claim 1,
   wherein said STO element is offset in an inner diameter (ID) direction; and
   wherein the side gap positioned at an outer diameter (OD) side of said main pole is narrower than the side gap positioned at an ID side of said main pole.

3. The MAMR head of claim 1,
   wherein said STO element is offset in an outer diameter (OD) direction; and
   wherein the side gap positioned at an inner diameter (ID) side of said main pole is narrower than the side gap positioned at an OD side of said main pole.

4. The MAMR head of claim 1,
   wherein the saturation magnetization of the side shield positioned on the side opposing said offset direction is higher than the saturation magnetization of the side shield positioned on the side of said offset direction.

5. The MAMR head of claim 1,
   wherein said STO element is offset in an inner diameter (ID) direction; and
   wherein the saturation magnetization of the side shield positioned at an outer diameter (OD) side of said main pole is higher than the saturation magnetization of the side shield positioned at an ID side of said main pole.

6. The MAMR head of claim 1,
   wherein said STO element is offset in an outer diameter (OD) direction; and
   wherein the saturation magnetization of the side shield positioned at an inner diameter (ID) side of said main pole is higher than the saturation magnetization of the side shield positioned at an OD side of said main pole.

7. The MAMR head of claim 1 configured for shingled magnetic recording,
   wherein the maximum width of said main pole at said air bearing surface is wider than a corresponding effective recording track width.

8. The MAMR head of claim 7,
   wherein the width of said STO is narrower than the maximum width of said main pole at said air bearing surface and is approximately equal to said corresponding effective recording track width.

9. A hard disk drive, comprising:
   a head slider, comprising:
      a magnetic writer main pole extending to an air bearing surface,
      a shield wrapping around at least a portion of said main pole, said shield comprising a trailing shield at a trailing side of said main pole and a side shield at each respective side of said main pole in a cross-track direction,
      a gap between said main pole and said shield, said gap comprising a trailing gap between said trailing shield and said main pole and a side gap between each respective side shield and said main pole,
      a spin torque oscillator (STO) element positioned between said main pole and said trailing shield and offset in a particular offset direction from a centerline of said main pole, and
      wherein the side gap positioned on the side opposing said offset direction is narrower than the side gap positioned on the side of said offset direction;
   a magnetic-recording disk rotatably mounted on a spindle; and
   a voice coil motor configured to move the head slider to access portions of the magnetic-recording disk.

10. The hard disk drive of claim 9,
    wherein the saturation magnetization of the side shield positioned on the side opposing said offset direction is higher than the saturation magnetization of the side shield positioned on the side of said offset direction.

11. The hard disk drive of claim 9 configured for shingled magnetic recording,
    wherein the maximum width of said main pole at said air bearing surface is wider than a corresponding effective recording track width.

12. The hard disk drive of claim 11,
    wherein the width of said STO is narrower than the maximum width of said main pole at said air bearing surface and is approximately equal to said corresponding effective recording track width.

13. The hard disk drive of claim 11, comprising:
    an electronic component configured to execute one or more sequences of instructions which, when executed by one or more processors, causes performance of:
       when head slider skew angle is less than approximately ten degrees, overwriting an immediately adjacent area of said magnetic-recording disk while preserving an area of said magnetic-recording disk farther from said head slider in said offset direction; and
       when said head slider skew angle is greater than approximately ten degrees, overwriting an immediately adjacent area of said magnetic-recording disk while preserving an area of said magnetic-recording disk farther from said head slider in a direction opposing said offset direction.

* * * * *